United States Patent Office 2,751,415
Patented June 19, 1956

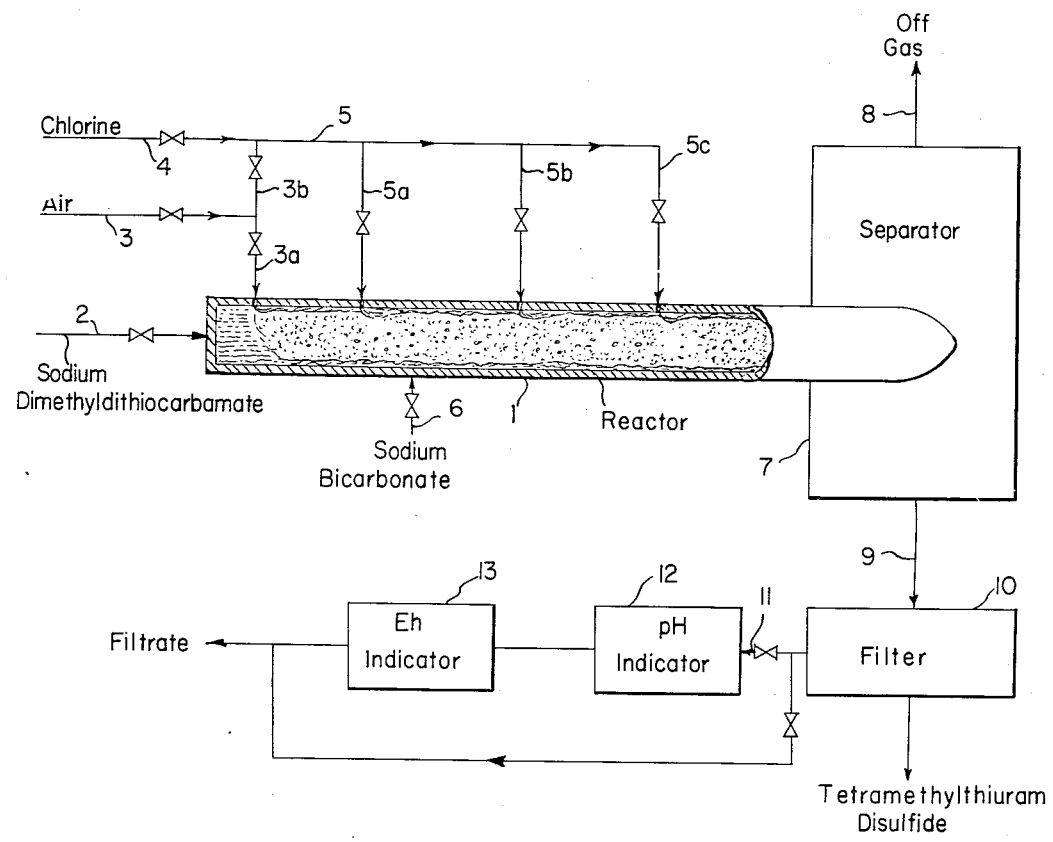

2,751,415

PREPARATION OF THIURAM DISULFIDES

John R. Cheshire, Westfield, N. J., and William R. Trutna, Pasadena, Tex., assignors to E. I. du Pont de Nemours and Company, Wilmington, Del., a corporation of Delaware Application August 20, 1953, Serial No. 375,410

5 Claims. (Cl. 260—567)

This invention relates to a process for the manufacture of tetramethylthiuram disulfide. More particularly, it relates to a continuous process in which an aqueous solution of a salt of dimethyldithiocarbamic acid while moving in annular flow thru a pipe is oxidized by the action of a dilute chlorine gas to tetramethylthiuram disulfide, a bicarbonate being introduced into the pipe at an intermediate point to maintain certain pH conditions all as will be more fully described below.

In the drawing, there is shown in semi-diagrammatical form an apparatus adapted for use in the practice of a preferred embodiment of the present invention.

Having reference to the drawing, there will be seen as a central unit a reactor 1 which is in the form of a tube or a pipe. Into one end of the reactor, there is fed thru a pipeline 2 an aqueous solution of a salt of dimethyldithiocarbamic acid. Sodium dimethyldithiocarbamate, which is shown in the drawing, is the preferred salt for economic reasons but it will be appreciated that other water soluble salts such as the ammonium and potassium salts of dimethyldithiocarbamic acid can also be used.

Chlorine, which serves to oxidize the dimethyldithiocarbamate, is fed into the reactor 1 in admixture with an inert gaseous diluent. Air, as shown in the drawing, is the preferred gaseous diluent for economic reasons but other inert gases such as nitrogen can be used if desired.

In the preferred embodiment shown in the drawing, air is supplied thru pipeline 3 and a portion of that air sufficient to induce turbannular flow of the aqueous solution of the dimethyldithiocarbamate in reactor 1 is introduced into the reactor thru pipeline 3a. The remaining air flows thru pipeline 3b for mixture with chlorine supplied thru pipeline 4 and the resulting gaseous mixture is introduced into reactor 1 at a plurality of points spaced along the length of the pipe constituting reactor 1 as indicated by pipelines 5a, 5b, and 5c.

More or fewer addition points of the chlorine-inert diluent mixture into the reactor than are shown in the drawing can be employed. Indeed, the total chlorine and air feeds can be premixed and introduced into the pipeline reactor 1 at a single point but the full advantages provided by the preferred processes of the invention are not attained by such practice.

The aqueous solution of the dimethyldithiocarbamate as introduced into the pipeline reactor has, according to the processes of this invention, a pH within the range of about 9 to 11. The concentration of dithiocarbamate in this solution can be varied widely up to about 15% by weight of the dithiocarbamate. At higher concentrations, the slurries formed in the reactor as tetramethylthiuram disulfide precipitates are inconveniently thick and tend to interfere with the flow pattern and clog the reactor. We prefer to operate at a dithiocarbamate feed concentration in the order of 8 to 10% by weight.

The chlorine, as introduced into contact with the dimethyldithiocarbamate, is in gaseous form and is diluted with an inert gaseous diluent. This gaseous mixture as brought into contact with the liquid component in the pipeline reactor should contain at least ten volumes of the inert gaseous diluent per volume of gaseous chlorine and, preferably, from about ten to twenty-five volumes of the inert gaseous diluent per volume of gaseous chlorine altho higher dilutions of the chlorine can be used if desired.

The gaseous and liquid components are fed into the pipeline reactor at relative gas to liquid rates, that is, in such proportions and amounts, as to provide an annular flow of the liquid component substantially thruout the length of the reaction zone in the pipe.

The term "annular flow" is used to connote a state of flow wherein a liquid is propelled thru a pipe in a continuous stream which assumes the form of an annular stream flowing along the walls of the pipe. The gas flows thru the center of the pipe in the passage formed by the annular stream of the liquid component. Such flow is also sometimes referred to as "turbannullar flow" and the pipe in which a reaction takes place with gaseous and liquid components flowing in this manner is called a "turbannular reactor."

Annular flow is obtained by use of relatively high gas to liquid velocities. The exact velocities required, however, vary with many factors such as the pipeline reactor dimensions, viscosities, pressure gradients, liquid component feed rate, etc. The interrelation of such factors is well known and is discussed by Lockhart and Martinelli in Chemical Engineering Progress 45, 39–45 (1949). As a practical operating matter, however, the critical velocity above which annular flow occurs is readily determined by observation if, as is preferred, a transparent glass pipe is used as a reactor. If this is done, it will be noted that at relatively low gas input rates, there is obtained what is known as slug flow in which large bubbles of gas pass thru an otherwise completely filled pipe of liquid. As the gas flow is increased, the liquid and gas layers become stratified, the liquid on the bottom and the gas on the top. With still further increase, so-called slug flow is obtained in which the previously stratified flow is modified to produce wavy flow of the liquid component. As the gas flow is still further increased, the liquid component assumes an annular pattern around the entire inside walls of the pipe.

Annular flow provides an extreme degree of agitation of the liquid component as it is propelled by the gases thru the reactor. The liquid component is violently churned while retaining the annular flow pattern thus providing rapid intimate contact of the reactants. A representation of annular flow will be seen in the drawing in which reactor 1 is shown partly in a section along the length of the reactor.

As the reactants move along the pipeline reactor 1, the pH of the liquid component rapidly falls as the oxidation reaction proceeds. According to the processes of this invention, a bicarbonate is introduced into the pipeline reactor at an intermediate point, as shown by pipeline 6 in the drawing, at which the pH of the liquid component has not fallen below about pH 7. Preferably this bicarbonate addition is made at a point at which the pH of the liquid component is within the range of about pH 7.5–8.5.

The bicarbonate is conveniently added in aqueous solution at any desired concentration. Sodium bicarbonate is preferred for economic reasons but other alkaline bicarbonates such as the alkali metal bicarbonates, including ammonium bicarbonate, can also be used.

The oxidation reaction is exothermic and the processes of the invention are carried out preferably so that the temperature of the liquid component does not exceed about 60° C. This is conveniently done by introducing the reactants at room temperature or below if necessary.

Preferably, the liquid component is maintained within the temperature range of 20° C. to 35° C. thruout the reactor.

The liquid component is withdrawn from the reactor at a pH above about pH 5 and preferably within the range of pH 6–7, and separated from the gaseous component in a separator 7 which can be of the conventional kinds such as, for example, a cyclone separator.

The pH of the liquid component as withdrawn is maintained above pH 5 and, preferably, within the range of pH 6–7 by the aforementioned introduction of a bicarbonate into the reactor. Without the addition of the bicarbonate, the pH drops very low down to pH 1 or below and the effluent from the reactor is malodorous and in some cases presents waste disposal problems.

The gaseous component is removed from the separator thru line 8 and the liquid component thru line 9. At this point, the liquid component contains the desired tetramethylthiuram disulfide in solid particulate form suspended therein. The tetramethylthiuram disulfide is separated from the liquid component by means of filter 10 or other apparatus adapted for separating solids from liquids such as a centrifuge.

The filtrate or a portion thereof passes thru pipe 11 to pH indicator 12 and Eh (oxidation-reduction potential) indicator 13, according to the preferred embodiment shown in the drawing.

The amount of bicarbonate introduced in line 6 is varied as required to maintain the pH, as determined in pH indicator 12, above about pH 5 and preferably within the range of pH 6–7, these being the requisite pH conditions described above for the liquid withdrawn from the reactor.

The Eh indicator provides a convenient means for determining whether too much chlorine has been introduced into the reactor. According to preferred processes of this invention, the inputs of chlorine and dimethyldithiocarbamate are proportioned so that all or substantially all of the chlorine introduced has been reacted by the time the liquid component is withdrawn from the reactor. In other words, very little or no chlorine is left to be withdrawn in the off gas.

Preferably the process is carried out so that the liquid component as withdrawn from the reactor contains a very small amount of unreacted dimethyldithiocarbamate. We have found that this condition is attained by regulating the chlorine input so that the Eh of the liquid leaving the reactor is within the range of about −120 millivolts (mv.) to −160 mv. Somewhat more chlorine input than the stoichiometric amount required to oxidize all the dithiocarbamate feed, that is, more than one mol of chlorine per mol of dithiocarbamate, is required to attain this last mentioned result because some chlorine is consumed in reaction with the bicarbonate.

The tetramethylthiuram disulfide product separated from the liquid component can be washed with cold or warmed water to remove traces of the liquid component and water soluble impurities, and dried, preferably at low temperatures, in accordance with conventional practices.

In order that the invention may be better understood, the following detailed example is given in addition to the examples already given above.

*Example*

The process of this example is carried out in equipment of the kind illustrated in the drawing. The reactor is a three-eighth inch diameter glass tube seven feet long. The distance between the inlet of pipe 3a to the reactor and the inlet of pipe 5a is six inches. The distance between the inlet to pipe 5a and the inlet to pipe 5b, and also between the inlet of 5b and 5c is twenty inches. The distance between the inlet to pipe 5a and the inlet to pipe 6 is eleven inches.

A ten per cent by weight aqueous solution of sodium dimethyldithiocarbamate having a pH of 10 is fed into reactor 1 thru pipeline 2 at a rate of 1.50 pounds per minute. Air is fed into the reactor thru line 3a at a rate of 1.25 cubic feet per minute. Air introduced thru line 3b is mixed with chlorine introduced thru line 4 in the proportions of 1.25 cubic feet per minute of air to 0.033 pound per minute of chlorine. This gaseous mixture is then introduced into the reactor at a rate of 0.5 cubic feet per minute thru each of lines 5a, 5b, and 5c.

Annular flow of the aqueous component is produced by the introduction of the air thru line 3a and such flow is maintained thruout the reactor 1. The pressure drop thru the reactor is 3 to 4 pounds per square inch.

A five per cent by weight solution of sodium bicarbonate is fed into reactor 1 thru pipeline 6 at a rate of 0.18 pound per minute. At the point at which the sodium bicarbonate is introduced, the liquid component in the reactor has a pH of about 8.

The liquids and gases introduced into the reactor are at ambient temperatures, that is, in the order of 20 to 25° C. The reaction is exothermic and the liquid effluent from the reactor is at a temperature of 35 to 40° C.

In the operation conducted under the above conditions, the pH of the liquid in the effluent is 6.0 to 6.5. The Eh as measured by a calomel-platinum electrode is about −150 mv.

The liquid in the effluent is separated from the gaseous component in a cyclone separator. The off gas is adorless and free of fumes.

The tetramethylthiuram disulfide suspended in the liquid effluent is separated from the liquid by filtration, washed with water at a temperature of about 20° C., and dried in a cross-circulation air drier at about 90° C. The process yields an odorless, white, finely-divided solid tetramethylthiuram disulfide of high quality at a yield of about 96% and at a rate of about 0.1 pound per minute.

The above detailed example is given to illustrate a specific preferred embodiment of the invention. It will be understood that various modifications can be made in the details without departing from the scope of the invention described and claimed.

We claim:

1. A continuous process for the preparation of tetramethylthiuram disulfide which comprises feeding into a pipe an aqueous solution of a salt of dimethyldithiocarbamic acid at about pH 9–11, gaseous chlorine, and an inert gaseous diluent at relative gas to liquid rates required to provide annular flow of the liquid component in the pipe, said chlorine being introduced into the pipe in mixture with at least a portion of said inert diluent in proportions of at least ten volumes of inert diluent per volume of chlorine, whereby said salt is oxidized by the chlorine to tetramethylthiuram disulfide as it is propelled thru the pipe in annular flow in aqueous solution by the gaseous component, and the pH of the liquid component decreases as the salt is oxidized; withdrawing the liquid component, containing the tetramethylthiuram disulfide which has formed, from the pipe at a pH above about pH 5, said pH above about pH 5 being maintained by adding a bicarbonate to the liquid component at a point in the pipe at which the pH of the liquid component is above about pH 7.0, and separating the tetramethylthiuram disulfide from the liquid component withdrawn from the pipe.

2. A continuous process for the preparation of tetramethylthiuram disulfide which comprises feeding into a pipe an aqueous solution of sodium dimethyldithiocarbamate at about pH 9–11, at least one mol of gaseous chlorine per mol of sodium dimethyldithiocarbamate, and air at relative gas to liquid rates required to provide annular flow of the liquid component in the pipe, said chlorine being introduced into the pipe in mixture with at least a portion of said air in proportions of from about 10 to 25 volumes of air per volume of chlorine, and maintaining the liquid component in the pipe at a temperature below about 60° C., whereby said dimethyldithiocarbamate is oxidized by the chlorine to tetramethylthiuram disulfide as it is propelled thru the pipe in annular flow in aqueous solution by the gaseous component, and the pH of the liquid component decreases as the dimethyldithiocarbamate is oxidized; withdrawing the liquid component, containing the tetramethylthiuram disulfide which has formed, from the pipe at about pH 6–7 after substantially all the chlorine introduced into the pipe has been reacted, said pH of 6–7 in the liquid component as withdrawn being obtained by adding an alkali metal bicarbonate to the liquid component at a point in the pipe at which the pH of the liquid component has decreased to about pH 7.5–8.5, and separating the tetramethylthiuram disulfide from the liquid component withdrawn from the pipe.

3. A continuous process for the preparation of tetramethylthiuram disulfide which comprises feeding into a pipe an aqueous solution of sodium dimethyldithiocarbamate at about pH 9–11, at least one mol of gaseous chlorine per mol of sodium dimethyldithiocarbamate, and air at relative gas to liquid rates required to provide annular flow of the liquid component in the pipe, said chlorine being introduced into the pipe in mixture with at least a portion of said air at a plurality of points spaced along the length of the pipe, the chlorine as introduced being mixed with from about 10 to 25 volumes of air per volume of chlorine, and maintaining the liquid component in the pipe at a temperature from about 20° C. to 35° C., whereby said dimethyldithiocarbamate is oxidized by the chlorine to tetramethylthiuram disufide as it is propelled thru the pipe in annular flow in aqueous solution by the gaseous component, and the pH of the liquid component decreases as the dimethyldithiocarbamate is oxidized; withdrawing the liquid component, containing the tetramethylthiuram disulfide which has formed, from the pipe at about pH 6–7 and EH—120 mv. to —160 mv., said pH of 6–7 in the liquid component as withdrawn being obtained by adding an aqueous solution of an alkali metal bicarbonate to the liquid component at a point in the pipe at which the pH of the liquid component has decreased to about pH 7.5–8.5, and separating the tetramethylthiuram disulfide from the liquid.

4. The continuous process of preparing tetramethylthiuram disulfide by the reaction of a salt of dimethyldithiocarbamic acid and chlorine in a pipe reactor comprising (1) introducing an aqueous solution of a salt of dithiocarbamic acid at about pH 9–11 into the reaction area; (2) inducing turbannular flow in the reaction area by introducing an inert gas into the reaction area; (3) introducing into the reaction area at a plurality of points downstream from the point of introduction of said inert gas a mixture of chlorine with an inert gas in proportions of at least 10 volumes of inert gas per volume of chlorine, said chlorine being introduced in an amount to maintain the liquid component leaving the reaction area at an Eh of —120 mv. to —160 mv., said amount being equal to at least one mol of gaseous chlorine per mol of said salt of dimethyldithiocarbamic acid; (4) introducing into the reaction area at a point downstream from the first point of addition of chlorine gas where the pH of the liquid component of the reaction mass has decreased to about pH 7.5 to 8.5 an alkaline bicarbonate solution to give the liquid component leaving the reaction area a pH of 6–7; (5) maintaining the temperature in the reaction area of less than 60° C.; and (6) separating the tetramethylthiuram disulfide from the liquid component leaving the reaction area.

5. In the continuous process for the preparation of tetramethylthiuram disulfide by feeding into a pipe an aqueous solution of a salt of dimethyldithiocarbamic acid at about pH 9–11, gaseous chlorine, and an inert gaseous diluent at relative gas to liquid rates required to provide annular flow of the liquid component in the pipe, the chlorine being introduced into the pipe in mixture with at least a portion of the inert diluent in proportions of at least 10 volumes of inert diluent per volume of chlorine, whereby the salt is oxidized by the chlorine to tetramethylthiuram disulfide as it is propelled through the pipe in annular flow in aqueous solution by the gaseous component, and the pH of the liquid component decreases as the salt is oxidized; the step of adding a bicarbonate to the liquid component at a point at which the pH of the liquid component is above about pH 7.0 to provide a pH above about pH 6 of the liquid component as withdrawn.

References Cited in the file of this patent

UNITED STATES PATENTS

| | | |
|---|---|---|
| 1,782,111 | Adams et al. | Nov. 18, 1930 |
| 1,796,977 | Bailey | Mar. 17, 1931 |
| 2,286,690 | Sibley | June 16, 1942 |
| 2,375,083 | Cooper | May 1, 1945 |